United States Patent
Mohnl et al.

(10) Patent No.: US 8,448,250 B2
(45) Date of Patent: May 21, 2013

(54) METHOD AND APPARATUS FOR THE TRANSMISSION OF CONFIDENTIAL AND NON-CONFIDENTIAL DATA

(75) Inventors: Gerald Mohnl, Zwentendorf (AT); Rupert Fuchsgruber, Klosterneuburg (AT)

(73) Assignee: Frequentis Nachrichtentechnik GmbH, Langen (DE)

( * ) Notice: Subject to any disclaimer, the term of this patent is extended or adjusted under 35 U.S.C. 154(b) by 1032 days.

(21) Appl. No.: 11/901,239

(22) Filed: Sep. 13, 2007

(65) Prior Publication Data

US 2008/0184374 A1    Jul. 31, 2008

(30) Foreign Application Priority Data

Sep. 15, 2006    (AT) ................. A 1548/2006

(51) Int. Cl.
*G06F 7/04*       (2006.01)
*G06F 17/30*      (2006.01)
*G06F 15/173*     (2006.01)
*H04N 7/16*       (2011.01)
*H04L 29/06*      (2006.01)

(52) U.S. Cl.
USPC ............ 726/26; 713/154; 713/160; 713/162; 709/238

(58) Field of Classification Search
USPC ............................................. 726/6
See application file for complete search history.

(56) References Cited

U.S. PATENT DOCUMENTS

| | | | |
|---|---|---|---|
| 3,715,508 A | | 2/1973 | Blasbalg |
| 4,215,421 A | * | 7/1980 | Giraud ............................ 705/67 |
| 4,473,850 A | * | 9/1984 | Foerster et al. ................ 386/327 |
| 4,538,257 A | * | 8/1985 | Klinger ........................... 369/106 |
| 5,450,443 A | * | 9/1995 | Siegel et al. .................... 375/286 |
| 6,477,650 B1 | * | 11/2002 | Kokubo ............................ 726/26 |
| 6,728,883 B1 | * | 4/2004 | Kohashi et al. .................. 726/26 |
| 6,975,469 B2 | * | 12/2005 | Sakai ................................ 360/46 |
| 7,069,590 B1 | * | 6/2006 | Malvar et al. .................... 726/26 |
| 7,181,540 B2 | * | 2/2007 | Whitaker et al. .............. 709/249 |
| 7,400,727 B2 | * | 7/2008 | Kadono ........................... 380/203 |
| 8,140,943 B1 | * | 3/2012 | Wu et al. ......................... 714/769 |
| 2005/0123138 A1 | * | 6/2005 | Abe et al. ........................ 380/255 |

(Continued)

FOREIGN PATENT DOCUMENTS

| | | |
|---|---|---|
| DE | 35 33 787 A1 | 4/1987 |
| EP | 0 021 387 A1 | 1/1981 |
| JP | 55-021611 A | 2/1980 |
| WO | WO 87/07101 A1 | 11/1987 |

*Primary Examiner* — Carolyn B Kosowski
(74) *Attorney, Agent, or Firm* — Kilpatrick Townsend & Stockton LLP

(57) ABSTRACT

A method and a system for transmitting confidential and non-confidential data blocks between intake units (1, 1') and output units (3, 3') of a communication system. The communication system has intake units (1) for confidential data blocks, intake units (1') for non-confidential data blocks, output units (3) for confidential data blocks, and output units (3') for non-confidential data blocks. A data distribution unit (2) transmits data blocks with confidential information from the intake units (1) for confidential information to the output units (3) for confidential information and data blocks with non-confidential information from the intake units (1') for non-confidential information to the output units (3') for non-confidential information. The two types of data blocks are differently marked, and the differently marked data blocks are transmitted in this form via the data distribution unit (2) in dependence on the marking from the intake unit in question to the corresponding associated output unit (3, 3').

13 Claims, 2 Drawing Sheets

U.S. PATENT DOCUMENTS

2006/0156412 A1* 7/2006 Malvar et al. .................. 726/26
2006/0195907 A1* 8/2006 Delfs et al. ..................... 726/26
2007/0094738 A1* 4/2007 Carter ............................ 726/26
2007/0256139 A1* 11/2007 Gaos et al. ..................... 726/26

* cited by examiner

METHOD AND APPARATUS FOR THE TRANSMISSION OF CONFIDENTIAL AND NON-CONFIDENTIAL DATA

CROSS-REFERENCES TO RELATED APPLICATIONS

This application claims priority from Austrian Application No. A 1548/2006 filed Sep. 15, 2006, the disclosure of which is incorporated herein by reference.

BACKGROUND OF THE INVENTION

The present invention concerns a method for transmitting confidential and non-confidential information between and to appropriately authorized participants.

Such an approach and a communication system useable therewith is known from EP 0031387.

Users of communication systems, and in particular users of military communication systems, must communicate with different persons and organizations entitled to different levels of trust. Confidential information that may be exchanged between trusted persons or parties may never be permitted to reach untrusted parties, or be read or changed by them. Conventional systems for securing the trustworthiness within a communication system provide the users thereof with two physically separated systems having differing devices for confidential and non-confidential information. This frequently provides insufficient security.

BRIEF SUMMARY OF THE INVENTION

It is an object of the present invention to assure in a simple manner that confidential information does not reach participants who may only receive non-confidential information. The present invention also seeks to prevent the transmission of confidential information which, due to accidental or intentional transmission errors, including, for example, those caused by intentional manipulation, is transmitted to participants who are not entitled to it.

The method of the present invention assures in a simple manner and with a simple system the needed separation of confidential and non-confidential information within a communication system or network. An important feature of the present invention is that confidential information is separated from non-confidential information. Instead, different and readily recognizable markings are preferably applied to the data blocks, or the data blocks are otherwise unequivocally marked as belonging to one of the two types of information, preferably the confidential information, so that they can be readily differentiated. An undesirable influencing of the data that is to be transmitted can be securely prevented by using an added data signal, and the marking can be applied quickly and securely in a manner that makes it readily recognizable.

The present invention therefore concerns the transmission of differently evaluated data blocks which are to be separated from each other and/or differently treated and forwarded. The actual contents of the data blocks are of no concern to the present invention. One type of data blocks that is to be transmitted has "confidential" data blocks, and the other type of data blocks has "non-confidential" data blocks.

The following describes the present invention with reference to the drawings.

DETAILED DESCRIPTION OF THE INVENTION

Figure 1:
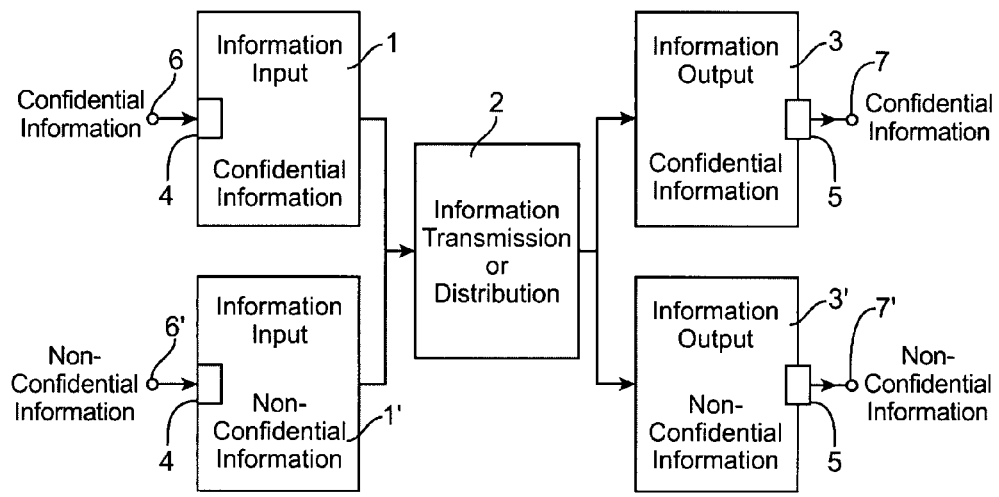
FIG. 1 schematically shows a communication system for the transmission of confidential and non-confidential information and data blocks.

The separation of confidential and non-confidential information principally employs two mechanisms:

an unequivocal assignment of the confidential or non-confidential marker to all of the to-be-transmitted data blocks in all components of the communication systems, and in particular in voice transmission systems, and/or a sufficient monitoring of system processes that are relevant to its security, especially for its configuration, the employed parameters and the actual use of the system.

For assuring confidentiality, it is necessary to analyze the information path of the communication system. In accordance with FIG. 1, the following functional blocks define the path:

information input into the communication system at intake units 1, 1', information transfer within the communication system via a data distribution unit 2, information output from the communication system at output units 3, 3'.

The number of intake units 1 for the transmission of confidential information containing data blocks as well as the number of intake units 1' for the input of data blocks with no confidential information can be freely selected. User instruments, components and external devices are coupled to an A/D converter 4 which precedes each intake unit 1, 1'. These include microphones, telephones or interfaces to other transmission devices or networks, particularly voice transmission installations. The communication system of the present invention is particularly useful for voice transmission systems. If desired, the transmission of signals and/or data is equally possible. Video and/or voice data are primarily transmitted with data blocks.

Figure 4:
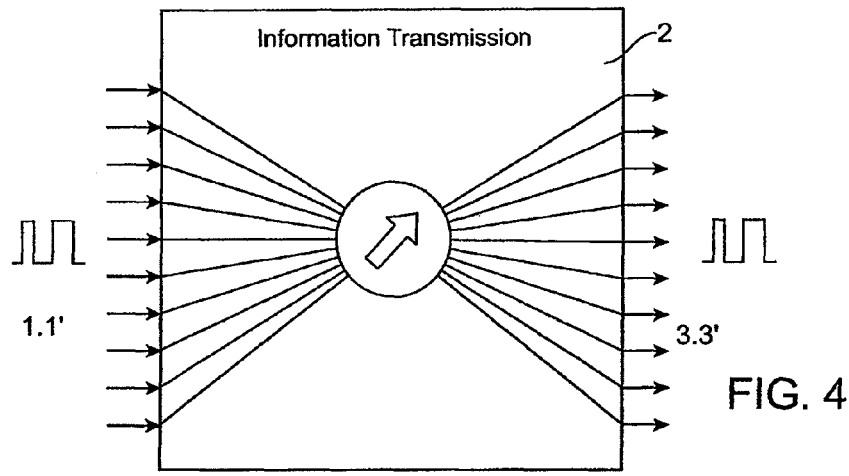
FIG. 4 schematically shows the functions of a data distribution system.

Intake units 1, 1' are coupled to a data distribution 2 which is not further shown in FIG. 4. Data distribution unit 2 provides that data blocks received from intake units 1 for confidential information are directed to the desired output unit(s) 3 for the output of data blocks with confidential information. Data distribution unit 2 also assures that data blocks received from intake units 1' for non-confidential information are transmitted to the corresponding output(s) 3' for the output of non-confidential information. The number of output units 3, 3' can be varied as desired.

With such communication systems, there exists the danger that errors occur in data distribution units 2 so that confidential information might be forwarded to output units of participants who are only entitled to receive non-confidential information. Thus, due to errors in the data distribution unit 2, confidential information might not only be forwarded to output units for confidential information, but also to output units for non-confidential information.

In accordance with the invention, data distribution system 2, which can be a switch, forwards data blocks with confidential information inputted to an intake unit 1 for confidential data blocks to an output unit 3 for data blocks with confidential information. The data distribution unit further forwards data blocks with non-confidential information inputted to the intake unit 1' for non-confidential information to output units 3' for non-confidential information. In addition, the data distribution unit 2 differently marks the two types of data blocks. These differently marked data blocks are transmitted in this form via the data distribution unit 2 from the respective intake units to the corresponding output units 3, 3' associated with the applied markings. A data signal is further applied to one type of data block (that is, either the confidential or non-confidential data blocks) inputted to the respective intake units 1, 1'. Data blocks identified with the data signal are transmitted in this form via data distribution unit 2 from the intake unit for the identified type of data block to the corresponding output unit 3, 3' associated with it. The added data signal is a voltage, especially a predetermined direct current voltage value.

Figure 2:
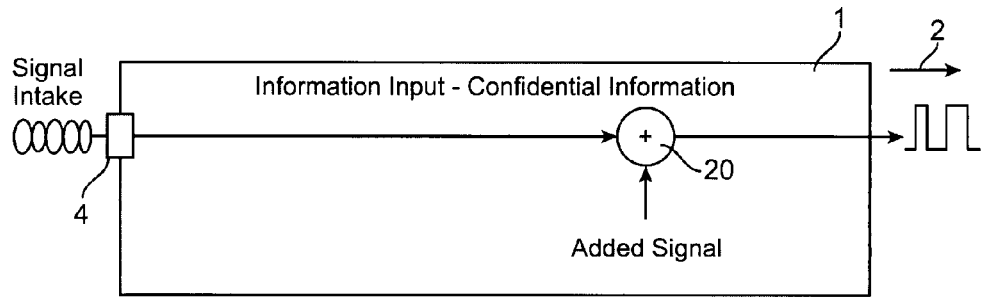
FIG. 2 schematically shows an intake unit for confidential information.

Data blocks inputted to intake units 1 for confidential data blocks are preferably identified with the added data signal. In accordance therewith, FIG. 2 illustrates an intake unit 1 for confidential information. The received data, especially voice data, is provided with an added data signal after it has been digitized, and the signal resulting therefrom is forwarded via data distribution unit 2 to the desired participant or output unit. The added signal is appended to the information without altering the information content. The presence of such an added data signal unequivocally identifies within the communication system and within the data distribution unit 2 that the information is confidential.

Figure 3:
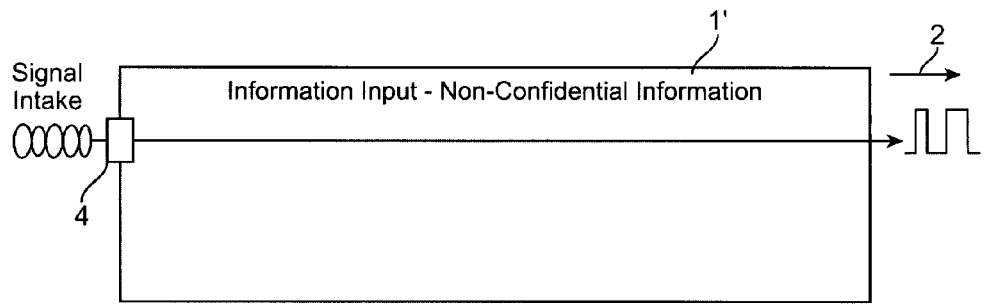
FIG. 3 shows an intake unit for non-confidential information.

FIG. 3 schematically shows an intake unit 1' for data blocks with non-confidential information. Data signals received by A/D converter 4 are in this case forwarded to data distribution unit 2 without being altered by intake unit 1'.

Data blocks with non-confidential information received at the signal intake are forwarded without being changed by the intake unit (FIG. 1).

In this case, the absence of the added signal unequivocally identifies within the communication system that the information is not confidential.

The added data signal can be applied to data blocks with confidential information inputted to the intake unit 1. Alternatively, the other type of data blocks, namely data blocks with non-confidential information, can be marked with the added data signal.

Data distribution unit 2 principally connects each available intake unit 1, 1' with each available output unit 3, 3'. However, it is preferred that data distribution unit 2 only sends data blocks with confidential information to output units for confidential information. Likewise, output units for non-confidential information preferably only receive data blocks with non-confidential information.

Information from intake units 1, 1' is forwarded within the overall information transfer or the data distribution unit 2 to any desired number of output units 3, 3'. Neither the information nor the added signal are thereby altered.

Figure 5:
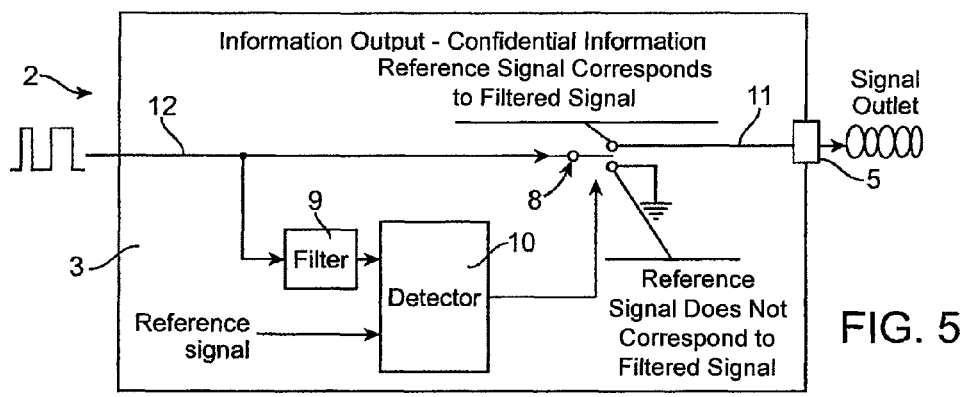
FIG. 5 shows an output unit for confidential information.

FIG. 5 shows an output unit 3 for confidential information. An incoming data block from data distribution unit 2 is fed to a switching unit 8, for example via a lead 12. In addition, the incoming digitized data block is fed to a filter 9 and due to the presence of the added data signal is checked for the presence of an added data signal. For this, a detector 10 has or is provided with a reference signal that corresponds to the added data signal. Detector 10 compares the output signal from filter 9 with the reference signal. If the output signal from filter 9 corresponds to the reference signal, the received data block is judged as having confidential information. As a result, switching unit 8 directs the data block to an output lead 11 so that the data block at switching unit 8 can be sent to the intended recipient via a D/A converter 5. The superimposed added data signal can be removed or subtracted. In practice, the superimposed added data signal does not affect the quality of the received data. The data block with the superimposed added data signal can therefore be made available to the recipient.

In the event detector 10 determines that the signal from filter 9 does not include an added data signal, it places switching unit 8 in its blocking position or in a position to suppress the received data blocks, for example by connecting data lead 12 to ground.

Information received at the intake for the information output (FIG. 1) for confidential information is forwarded to the signal outlet of the affected output unit in dependence on the presence of the additive data signal. This involves filtering the data block so that the output signal of the filter can be unequivocally compared with the reference signal. If the reference signal and the filter output signal correspond, the data block is sent to the outlet of the information output. When the reference signal and the filter signal do not correspond, the signal output receives no signal. In an energy-free state, the inputted signal is not forwarded to the signal output.

It is advantageous to transfer the information in data blocks which are free of direct current. In this context, it is preferable to code the data blocks with an HDB3 code or a direct current-free code. In such a case, it is further advantageous to superimpose the added data signal on the data block as a voltage, especially a predetermined direct current voltage value. The length of the data blocks is principally freely selectable.

It is further advantageous when the intake units 1, 1' and the output units 3, 3', and especially their interfaces for inputting and outputting confidential information, are physically separated from data blocks with non-confidential information.

In the same manner, incoming data blocks can be checked and forwarded or suppressed when data blocks with non-confidential information are involved which have been marked with the added data signal to distinguish them from data blocks with confidential information.

Figure 6:
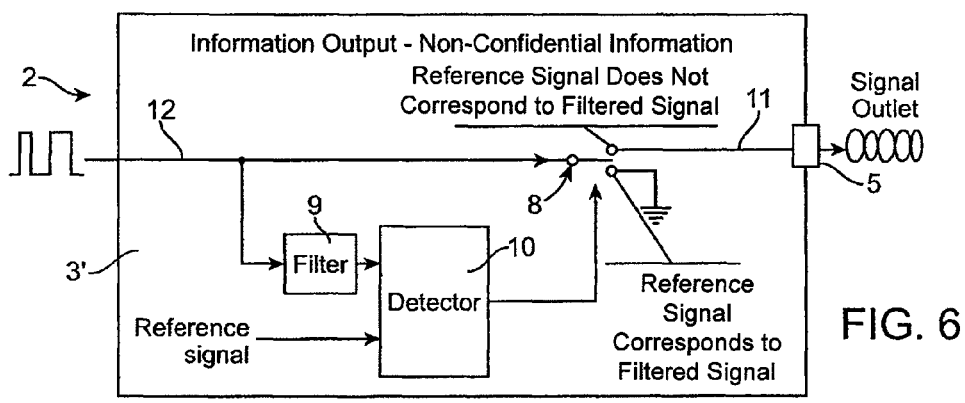
FIG. 6 shows an output unit for data blocks with non-confidential information.

FIG. 6 shows an output unit 3' for data blocks with non-confidential information.

Output units 3, 3' are principally identically constructed. Only the function of detector 10, which controls switching unit 8, must be set so that data blocks with the added data signal are either transmitted or suppressed, for example with the help of a connection to ground.

Data blocks for non-confidential information applied to the intake of the information output (FIG. 1) are forwarded to the signal outlet in dependence on the presence of the added data signal. The information signal or the data block are filtered so that the filter output signal can be unequivocally compared with the reference signal. When the reference signal and the filtered information signal correspond, the data block is not forwarded to the outlet, or no signal is applied to the outlet. When the reference signal and the filtered information signal do not correspond, the signal outlet receives the signal from the intake. In an energy-free state, the input signal is not transmitted to the signal outlet.

When information or data blocks are to be exchanged between participants in both directions, another communication system as shown in FIG. 1 must be provided. The communication system shown in FIG. 1 permits communications in one direction which runs from left to right in FIG. 1. To enable a data transmission in the opposite direction, the communication system illustrated in FIG. 1 is duplicated as a side-reversed arrangement.

Equipment such as telephones 6, 6', 7, 7', speakers and microphones, computers or interfaces to other transmission installations or networks are coupled to intake units 1, 1' and output units 3, 3'.

Each data block is provided with the added date signal. In particular the data signal is applied to each data block in its entirety. Header, transportation data and data and signals required for the transmission of the data blocks are unaffected thereby. The applied voltage signal is preferably a positive or a negative voltage value.

The magnitude of the voltage value for the added data signal is selectable and depends on the type of the data blocks used for transmitting the information.

The invention further involves a data carrier on which a program for performing the method of the present invention is stored.

What is claimed is:

1. A method performed by a communication system, the method comprising:
   transmitting confidential and non-confidential data blocks between intake units and output units of a communication system, wherein the communication system comprises an intake unit for confidential data blocks and an intake unit for non-confidential data blocks, an output unit for confidential data blocks and an output unit for non-confidential data blocks, and a data distribution unit for transmitting data, wherein the confidential data blocks from the intake unit for confidential data blocks are transmitted to the output unit for confidential data blocks, and non-confidential data blocks from the intake unit for non-confidential data blocks are transmitted to the output unit for non-confidential data blocks;
   assigning different markings to the confidential data blocks and the non-confidential data blocks respectively by encoding the confidential and non-confidential data blocks in a direct current-free code, wherein the data distribution unit is adapted to transmit the differently marked confidential and non-confidential data blocks from the confidential and non-confidential intake units to the corresponding confidential and non-confidential output units, respectively;
   selecting an additional data signal so that a predetermined direct current voltage value is added to the confidential data blocks;
   applying the additional data signal to the confidential data blocks with the respective intake unit; and
   transmitting the confidential or non-confidential data blocks with the additional data signal from the confidential or non-confidential intake unit to the corresponding confidential or non-confidential output unit respectively.

2. The method according to claim 1 further comprising applying the added data signal to data blocks comprising confidential information and inputted into the intake unit for confidential data blocks.

3. The method according to claim 1 further comprising:
   checking data signals received by the output units from the data distribution unit for the presence of the added additional data signal; and
   depending on the results of checking for the presence of the additional data signal in the data signals received by the output units, permitting or preventing an output of the data blocks.

4. The method according to claim 1 further comprising physically separating from each other the intake units and the output units for the respective input or output of confidential and non-confidential data blocks.

5. The method according to claim 1 further comprising coding data blocks with one of an HDB3 code and a direct current-free code.

6. The method according to claim 1 further comprising:
   filtering all data blocks received by each output unit from the data distribution unit to obtain a filtered signal;
   comparing the filtered signal with a reference signal that corresponds to the added signal;
   determining if the data block includes confidential or non-confidential information, based on the results of comparing the filtered signal with the reference signal; and
   permitting or preventing the output of the data blocks in dependence on the results of the comparison.

7. A communication system for the transmission of confidential and non-confidential data blocks between intake units and output units comprising:
   an intake unit for confidential data blocks and an intake unit for non-confidential data blocks;
   an output unit for confidential data blocks and an output unit for non-confidential data blocks, the confidential and non-confidential data blocks being encoded in a direct current-free code; and
   a data distribution unit connected to the intake unit for confidential data blocks, to the intake unit for non-confidential data blocks, to the output unit for confidential data blocks and to the output unit for non-confidential data blocks, wherein each of the confidential or non-confidential intake units for the input of confidential or non-confidential data blocks includes a linking device adapted to add a data signal to the inputted confidential or non-confidential data blocks directed via the data distribution unit to the associated confidential or non-confidential output unit respectively, wherein the additional data signal is selected so that a predetermined direct current voltage value is added to the confidential data blocks.

8. The system according to claim 7 wherein the intake unit for confidential data blocks includes the linking device.

9. The system according to claim 7 wherein the output units include control units for received data blocks limiting a receipt of data blocks with confidential information to output units for confidential information only and limiting the receipt of data blocks with non-confidential information to output units for non-confidential information only, wherein each control unit is adapted to check data received from the data distribution unit for the presence of the added data signal and to permit or prevent an output of the data blocks in dependence on the results of checking the data.

10. The system according to claim 7 wherein the intake unit and the output unit, and interfaces thereof, for respectively inputting and outputting the data blocks with confidential information and non-confidential information respectively are physically separated from each other.

11. The system according to claim 7 wherein the data blocks comprise one of an HDB3 code and a direct current-free code.

12. The system according to claim 7 further comprising:
   a filter for each output unit for data blocks received from the data distribution unit; and
   a comparator unit coupled to the filter for comparing a signal received from the filter with a reference signal that corresponds to the added data signal, and wherein in dependence on the results of comparing the signal from the filter with the reference signal outputting the data block is permitted or prevented.

13. The system according to claim 7 further comprising a switching unit responsive to a control unit permitting or preventing the confidential or non-confidential data blocks received by the respective confidential or non-confidential output unit from being directed or not directed to an output of the respective confidential or non-confidential output unit in dependence on the results of the comparison.

* * * * *